(12) United States Patent
Roach et al.

(10) Patent No.: US 7,789,544 B1
(45) Date of Patent: Sep. 7, 2010

(54) MODULAR OFF-ROAD ACCESSORY LIGHT RACK

(75) Inventors: Alan R. Roach, Escondido, CA (US); Stephen J. Mitchell, Aguanga, CA (US)

(73) Assignee: Baja Designs, Inc., San Marcos, CA (US)

( * ) Notice: Subject to any disclaimer, the term of this patent is extended or adjusted under 35 U.S.C. 154(b) by 412 days.

(21) Appl. No.: 11/973,657

(22) Filed: Oct. 10, 2007

(51) Int. Cl.
*B60Q 1/00* (2006.01)
(52) U.S. Cl. .................. 362/496; 362/370; 362/476
(58) Field of Classification Search .......... 362/234, 362/249.01, 249.06, 249.11, 249.16, 370, 362/413, 418, 427, 431, 485, 493, 496, 543
See application file for complete search history.

(56) References Cited

U.S. PATENT DOCUMENTS

| | | | | | |
|---|---|---|---|---|---|
| 3,586,270 | A | * | 6/1971 | Loffler et al. | 362/486 |
| 4,167,783 | A | * | 9/1979 | Mitchell | 362/236 |
| 4,220,981 | A | * | 9/1980 | Koether | 362/486 |
| 4,319,311 | A | * | 3/1982 | Mitchell | 362/249.09 |
| 5,171,083 | A | * | 12/1992 | Rich | 362/493 |
| 6,773,148 | B2 | | 8/2004 | Kasboske | |
| 6,783,266 | B2 | * | 8/2004 | McCoy et al. | 362/485 |

* cited by examiner

*Primary Examiner*—Hargobind S Sawhney
(74) *Attorney, Agent, or Firm*—James E. Curry

(57) ABSTRACT

A modular light rack assembly for off-road vehicles having a plurality of individual pieces that can be selectively connected to form a substantially linear assembly for attaching a variety of headlight subassemblies. In each embodiment, there is a common left hand mounting configuration and common right hand mounting configuration, so that each piece of the modular light rack assembly having one or both of these configurations on its end or ends is selectively connectable to any other piece to form a substantially linear assembly of any desired configuration.

22 Claims, 14 Drawing Sheets

MODULAR OFF-ROAD ACCESSORY LIGHT RACK

FIELD OF THE INVENTION

The invention relates in general to vehicle light racks mounted to off-road vehicles. More specifically, the invention relates to a modular light rack assembly having a plurality of individual pieces that can be selectively connected to form a substantially linear assembly for attaching a variety of headlight subassemblies. The light rack assembly is modular in that differently sized individual pieces are interchangeable between the end pieces. This interchangeability allows the light rack to be formed in a plurality of different configurations.

BACKGROUND OF THE INVENTION

The technology utilized in off-road vehicle racing has advanced substantially in recent years. Many off-road races require specialized lighting systems be equipped on their vehicles in order to be competitive in night racing conditions. Most manufacturers of such lighting products either sell individual headlight subassemblies requiring the purchaser to fabricate their own light rack, or sell a one size light rack housing a fixed number of headlights. However, most off-road racing vehicles today are uniquely designed, giving rise to a variety of different lighting requirements, and the one size light racks offered on the market today do not always meet these requirements. For example, one race team may desire a quantity of four 8 inch diameter headlights mounted on a rack spanning a distance of 5 feet on the front of the vehicle, while another race team may desire a quantity of six 4 inch diameter headlights mounted on a rack spanning a distance of 6 feet. Presently, a custom fabricated light rack frame would be required for each. The custom fabrication problem is further complicated since there are a variety of different headlight subassemblies to select from, and these different subassemblies come in a wide range of sizes and shapes. Thus, there is a need to provide a modular light rack assembly comprising a variety of interchangeable pieces that can be connected in a variety of different configurations to meet the individual lighting requirements of off-road racers.

BRIEF SUMMARY OF THE INVENTION

The present invention provides its benefits across a broad spectrum of vehicle light racks for off-road vehicles. Although the present invention is discussed in conjunction with high performance off-road race vehicles, it may be used for recreational off-road vehicles as well. While the description which follows hereinafter is meant to be representative of such applications, it is not exhaustive. As will be understood, the basic apparatus taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

It is one aspect of the present invention to provide a modular light rack capable of being assembled in a variety of configurations to meet any number of off-road vehicle lighting applications.

It is another aspect of the present invention to provide a modular light rack that is configured to maximize the visibility of the driver of an off-road vehicle when the light rack assembly is mounted on the vehicle.

It is a feature of the present invention that each piece of the modular light rack assembly is selectively connectable to any other piece of the modular light rack assembly.

It is another feature of the present invention that each piece of the modular light rack assembly has at least one end comprising a common left hand mounting configuration and/or another end having a common right hand mounting configuration, allowing each piece to be connected to any other piece.

It is still another feature of the present invention that the modular light rack assembly is selectively connected to form a substantially linear assembly to meet a variety of different off-road vehicle lighting requirements.

It is an advantage of the present invention that the substantially linear assembly establishes a low visibility profile that maximizes the visibility of the driver when the assembly is mounted to an off-road vehicle.

It is another advantage of the present invention that, with a variety of interchangeable pieces available, a multitude of different modular light rack assemblies can be provided to meet the lighting requirements of any off-road vehicle, thereby eliminating the need to custom fabricate a light rack.

These and other aspects, features, and advantages are achieved/attained in the apparatus of the present invention that comprises at least one light protector piece, a left hand piece, and a right hand piece. The light protector piece has a left connector end defining a common left hand mounting configuration, and a right connector end defining a common right hand mounting configuration. The light protector piece has an opening between the left and right connector ends to allow a light beam projected from a headlight to pass through. The left connector end of the light protector piece is selectively connectable to the right connector end of another light protector piece, and the right connector end is selectively connectable to the left connector end of another light protector piece. The left hand piece has a right mount end having the common right hand mount configuration, and the right hand piece has a left mount end having the common left hand mount configuration. The right mount end of the left hand piece is selectively connectable to the left connector end of the light protector piece, and the left mount end of the right hand piece is selectively connectable to the right connector end of the light protector piece. The light protector piece(s), the right hand piece, and the left hand piece are selectively connected, left hand mounting configuration to right hand mounting configuration, to form a substantially linear assembly.

At least one spacer piece may also be provided to establish a substantially linear assembly of a desired length. The spacer piece has a left connection end and a right connection end, the left connection end having the common left hand mounting configuration and the right connection end having the common right hand mounting configuration. The left connection end is selectively connectable to the right connector end of the light protector piece and selectively connectable to the right mount end of the left hand piece. The right connection end is selectively connectable to the left connector end of the light protector piece and selectively connectable to the left mount end of the right hand piece. When spacer piece(s) are provided, the light protector piece(s), right hand piece, left hand piece, and spacer piece(s) are selectively connected, left hand mounting configuration to right hand mounting configuration, to form the substantially linear assembly of the modular light rack.

A headlight mount member may also be provided, extending from the light protector piece(s), for mounting a headlight subassembly to the headlight mount member so that the light beam projected from the headlight subassembly passes is through the opening in the light protector piece. The headlight mount member may be integral with the light protector piece, or connected to the light protector piece with fasteners.

The left hand mounting piece and the right hand mounting piece have attachment ends for securing the light rack assembly to the off-road vehicle. In one embodiment, a first adjustment bracket is connected to the attachment end of the left hand mounting piece and a second adjustment bracket is connected to the attachment end of the right hand mounting piece. The adjustment brackets are then secured to the off-road vehicle, thereby securing the modular light rack assembly to the vehicle. The adjustment brackets may be configured to provide for the adjustment of the substantially linear assembly of the light rack assembly about a horizontal axis when the light rack assembly is secured to the vehicle.

In one embodiment, the left connector end, the left mount end, and left connection end of any spacer piece, all having the common left hand mounting configuration, comprise at least one tab. The right connector end, the right mount end, and the right connection end of any spacer piece, all having the common right hand mounting configuration, include at least one recess. In this embodiment, the tabs mate with the recesses when the light protector piece(s), right hand piece, left hand piece, and any spacer piece, are selectively connected to from the substantially linear assembly.

In another embodiment, the right connector end, the right mount end, and right connection end of any spacer piece, all having the common right hand mounting configuration, comprise at least one tab. The left connector end, the left mount end, and the left connection end of any spacer piece, all having the common left hand mounting configuration, include at least one recess. In this embodiment, the tabs mate with the recesses when the light protector piece(s), right hand piece, left hand piece, and any spacer piece, are selectively connected to from the substantially linear assembly.

In any embodiment, the light protector piece(s), right hand piece, left hand piece, and any spacer piece may interlock when selectively connected to form the substantially linear assembly. As used herein, the term "interlock" means that when the pieces are selectively connected, the resultant joint surface of these connections is flush, making the substantially linear assembly appear as a continuous single unit. As used herein, the term "selectively connectable" means that, for a given embodiment, the common left and right hand mounting configurations mate to one another, allowing the end of any piece having the common left hand mounting configuration to connect to the end of any other piece having the common right hand mounting configuration. The term "selectively connected" means that the pieces are secured together by any manner known to those skilled in the art to form a rigid structure, such as with threaded fasteners, press fit pins, rivets, or the like. The pieces may also be selectively connected together by welding, or bonding process such as brazing, as is known to those skilled in the art. As used herein, the term "each piece", "any piece", or "any other piece" refers exclusively to either a light protector piece, a left hand piece, a right hand piece, or a spacer piece, separately or in combination.

BRIEF DESCRIPTION OF THE DRAWINGS

The aspects, features and advantages of the present invention will become apparent upon consideration of the following detailed disclosure of the invention, especially when it is taken in conjunction with the accompanying drawings wherein.

To facilitate understanding, identical reference numerals have been used, where possible, to designate identical elements or features common to the figures.

DETAILED DESCRIPTION OF THE PREFERRED EMBODIMENTS

Figure 1:
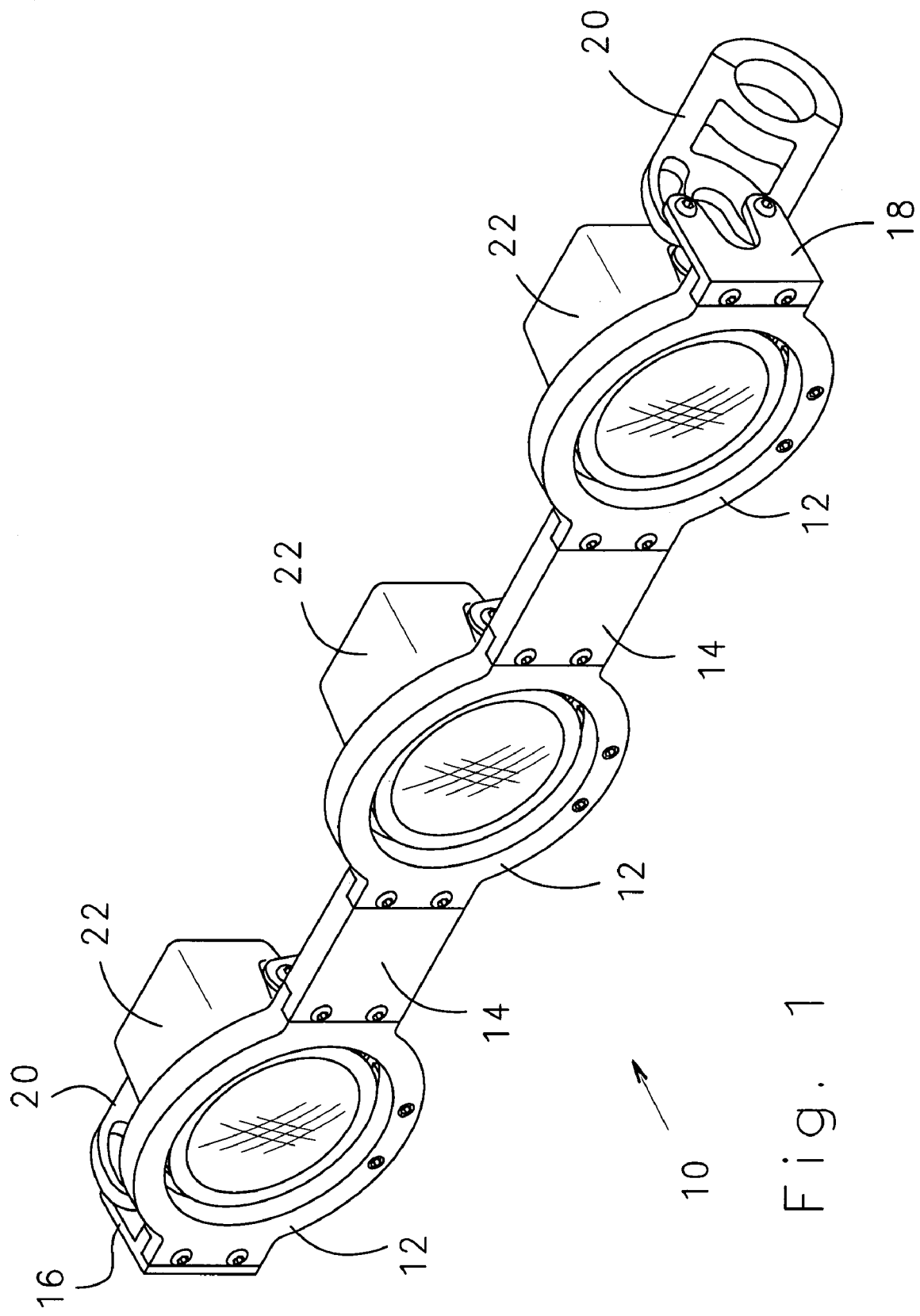
FIG. 1 is a perspective view of an embodiment of the present invention modular light rack assembly including headlight subassemblies.
Figure 2:
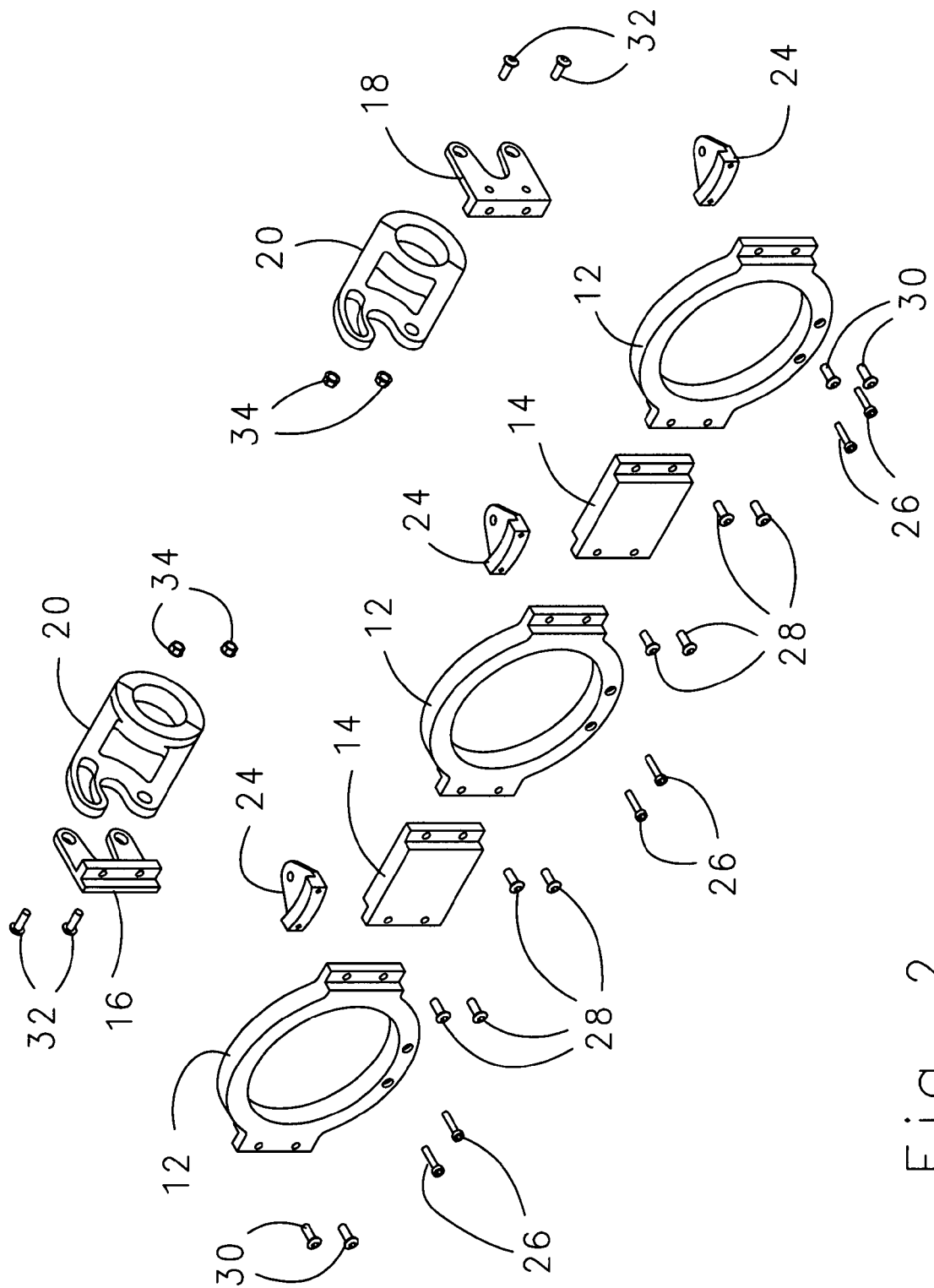
FIG. 2 is an exploded perspective view of the light rack assembly shown in FIG. 1 without the headlight subassemblies.

Referring to FIGS. 1-2, a modular light rack assembly is shown generally by number 10 in accordance with a first embodiment of the present invention. The modular light rack assembly 10 illustrated in FIGS. 1-2 is an exemplary configuration of the preferred embodiment comprising three light protector pieces 12 two spacer pieces 14, a left hand piece 16, and a right hand piece 18. Also shown are two adjustment brackets 20, one connected to left hand piece 16 and the other to right hand piece 18. The modular light rack assembly 10 in this example is configured to mount three headlight subassemblies 22. It is to be appreciated that the modular light rack assembly of the present invention can be configured to mount one headlight subassembly, or as many as needed, to meet individual off-road lighting requirements.

The individual components of the modular light rack assembly 10 of the first embodiment are shown in FIG. 2. For each light protector piece 12 there is a corresponding headlight mount member 24 which is connected to its corresponding light protector piece 12 with fasteners 26. The spacer pieces 14 are connected to the light protector pieces 12 with fasteners 28. The left hand and right hand pieces, 16 and 18 respectively, are attached to their adjacent light protector pieces 12 with fasteners 30. The attachment brackets 20 are connected to the left hand and right hand pieces, 16 and 18 respectively, with fasteners 32 and corresponding nuts 34.

Figure 3:
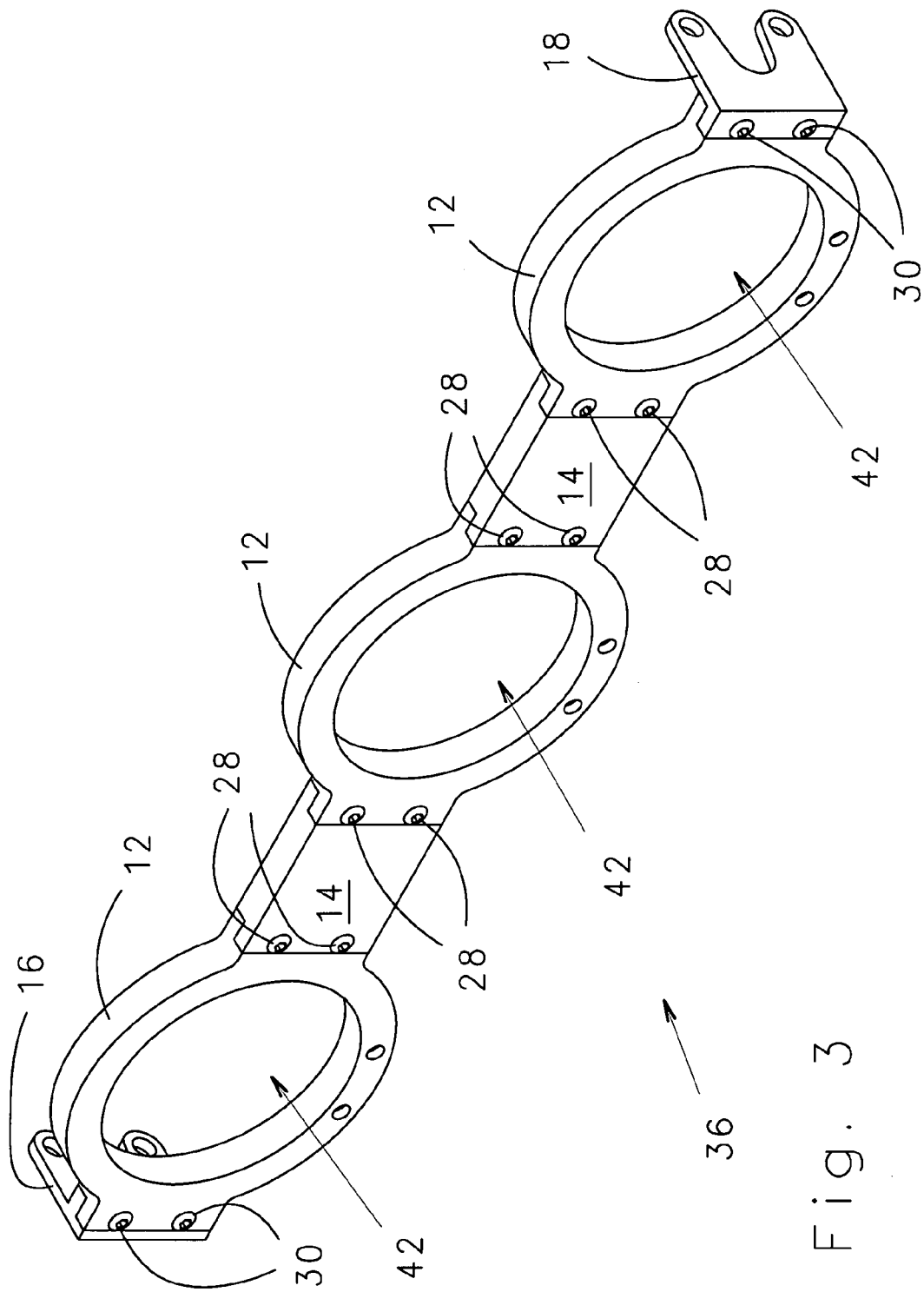
FIG. 3 is a perspective view of the substantially linear assembly of the light rack assembly shown in FIG. 1.

Referring to FIG. 3, a substantially linear assembly 36 of the first embodiment of the present invention modular light rack assembly 10 of FIGS. 1-2 is shown. The substantially linear assembly 36 is formed when the light protector pieces 12, left hand piece 16, right hand piece 18, and spacer pieces 14 are connected with fasteners 28 and 30. It is to be appreciated that the substantially linear assembly 36 has a substantially low visibility profile compared to prior art light racks which have upper and lower frame members that extend above and below the headlight subassemblies. This substantially low visibility profile maximizes the visibility of the driver of an off-road vehicle particularly when the light rack assembly is mounted on the front of the vehicle above the level of the hood.

Figure 4:
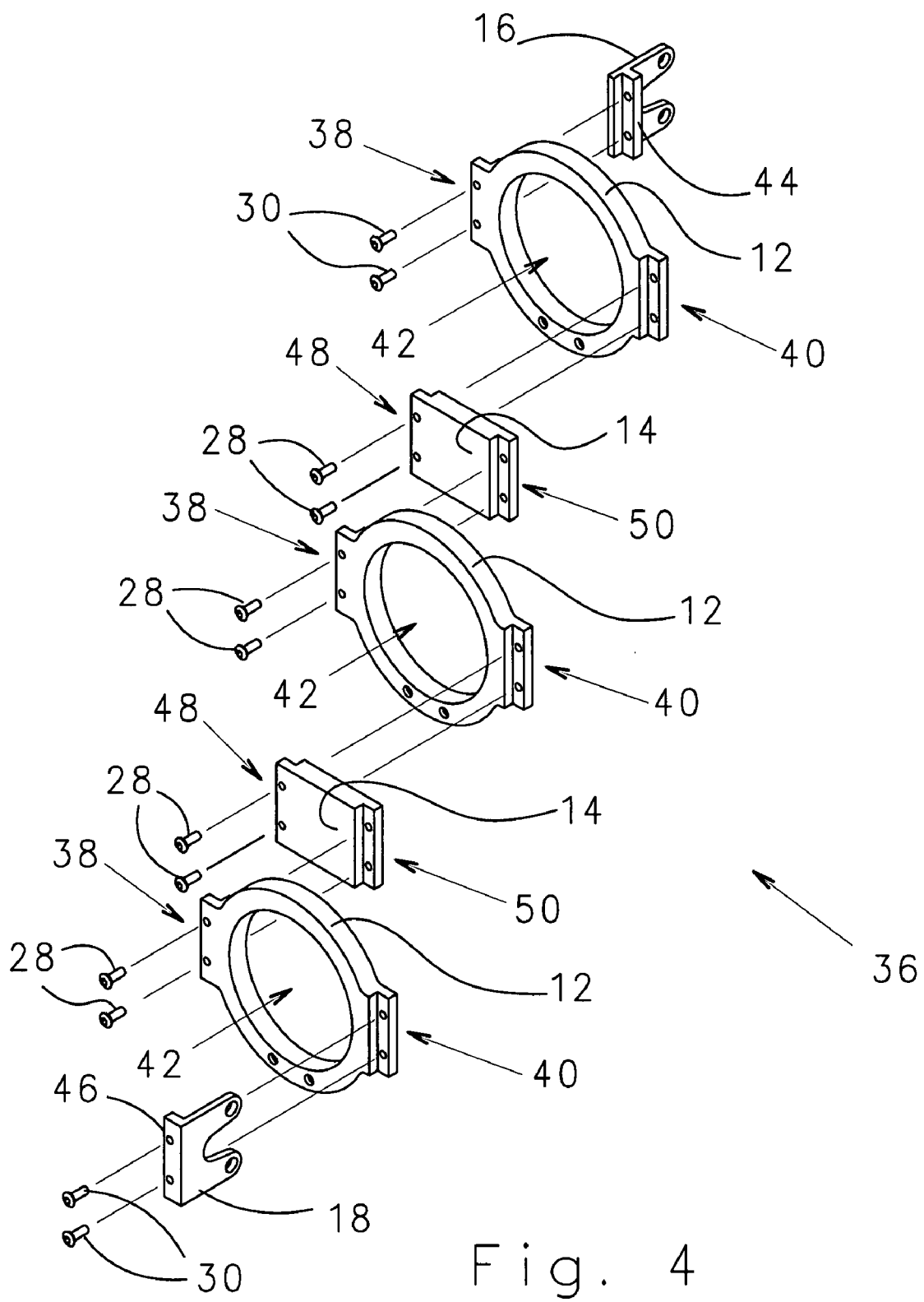
FIG. 4 is an exploded perspective view of the substantially linear assembly of the light rack assembly shown in FIG. 1.
Figure 5:
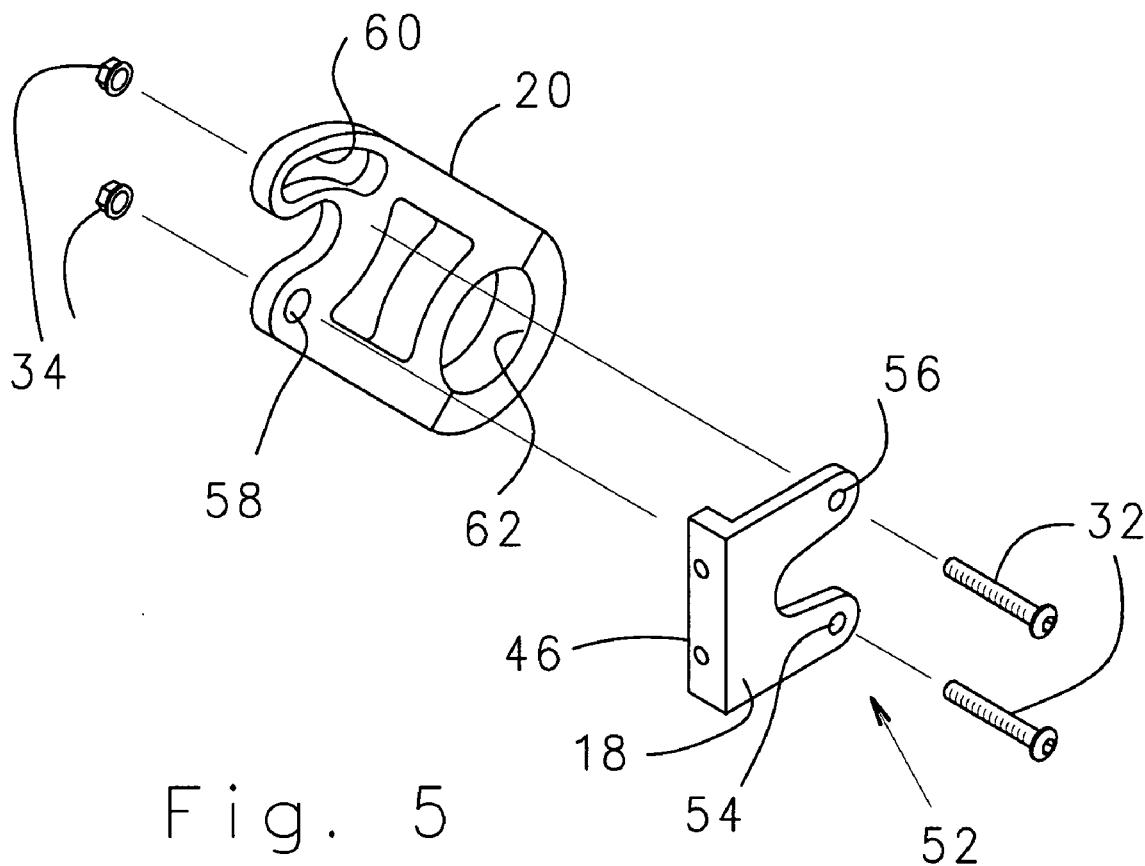
FIG. 5 is an exploded perspective view of a right hand piece and adjustment bracket of the embodiment shown in FIG. 1.
Figure 6:
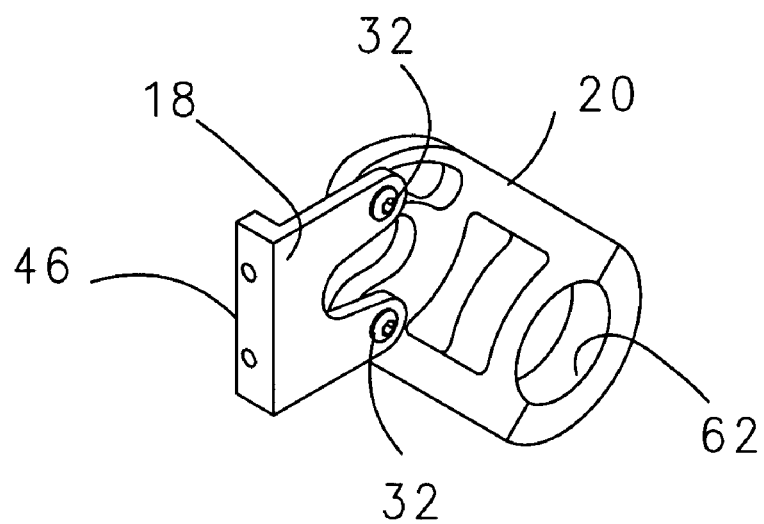
FIG. 6 is a perspective view of a right hand piece and adjustment bracket of the embodiment shown in FIG. 1.
Figure 7:
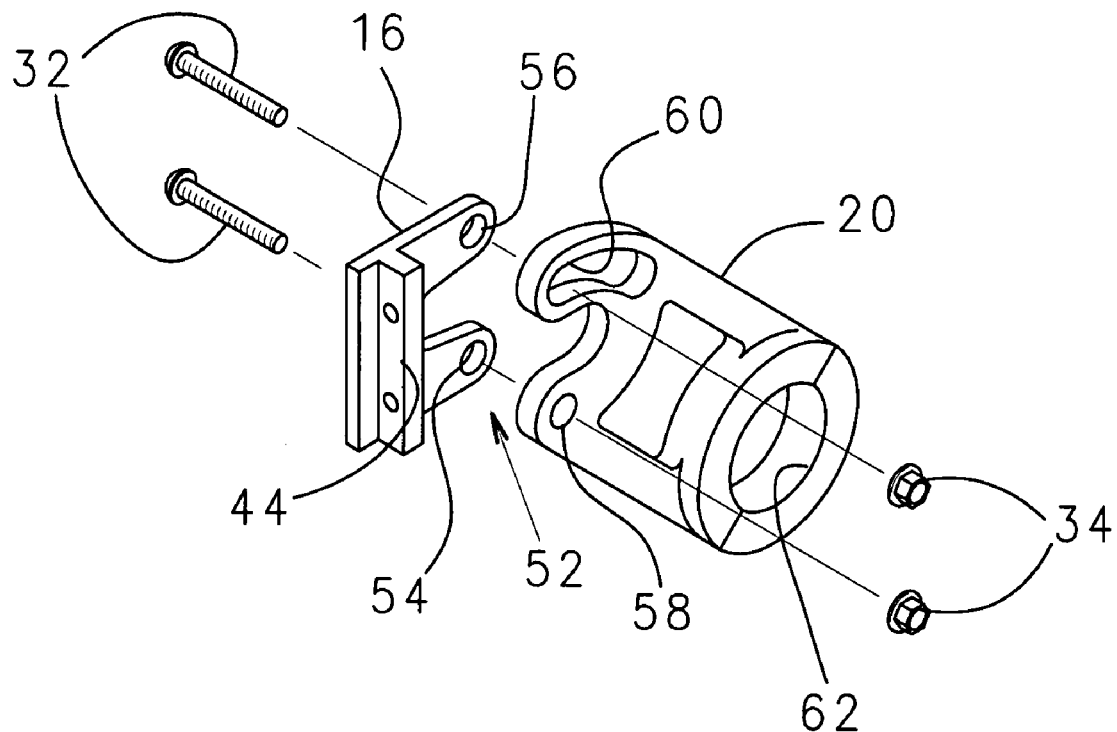
FIG. 7 is an exploded perspective view of a left hand piece and adjustment bracket of the embodiment shown in FIG. 1.
Figure 8:
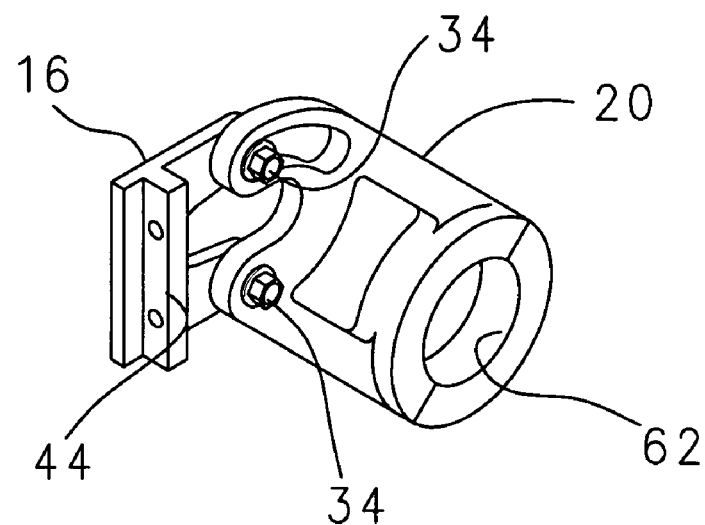
FIG. 8 is a perspective view of a left hand piece and adjustment bracket of the embodiment shown in FIG. 1.

In FIG. 4 the substantially linear assembly 36 of FIG. 3 is shown unassembled. Each light protector piece 12 has a left connector end indicated by numeral 38, and a right connector end indicated by numeral 40. Each light protector piece 12 has an opening, identified by numeral 42, between the left and right connector ends, 38 and 40 respectively, to allow a light beam projected from a headlight to pass through. The left connector end 38 defines a common left hand mounting configuration and the right connector end 40 defines a common right hand mounting configuration. It is to be appreciated that, for each embodiment, the end of any piece having the common left hand mounting configuration is selectively connectable to the end of any piece having the common right hand mounting configuration. The left hand piece 16 has a right mount end 44 having the common right hand mounting configuration and is therefore selectively connectable to the left connector end 38 of any light protector piece 12. The right hand piece 18 has a left mount end 46 having the common left hand mounting configuration and is therefore selectively connectable to the right connector end 40 of any light protector piece 12.

Figure 11:
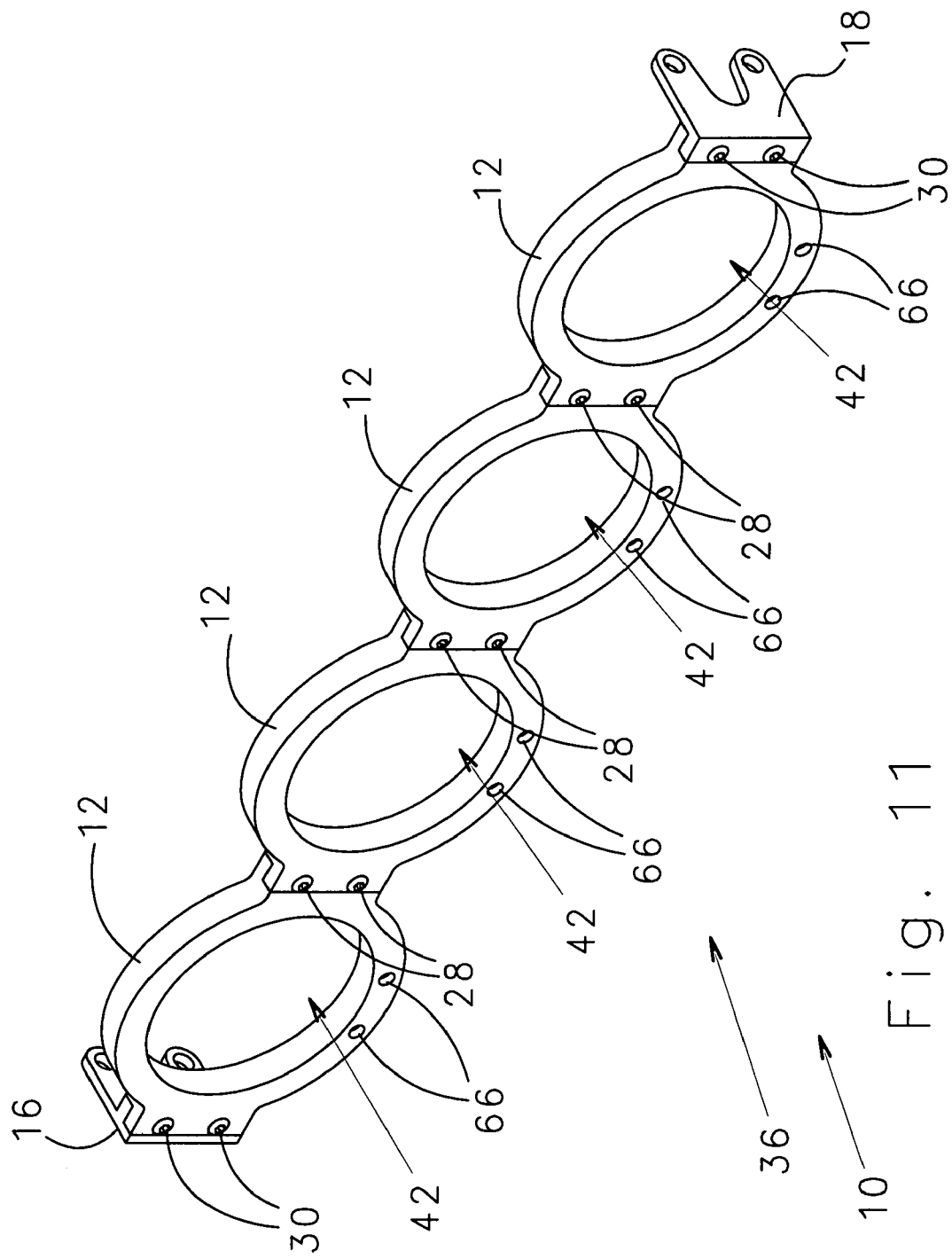
FIG. 11 is a perspective view of an alternative embodiment of the present invention modular light rack assembly, shown without headlight mount members, headlight subassemblies, or adjustment brackets.

Additionally, each spacer piece 14 has a left connection end identified generally by numeral 48 and a right connection end identified generally by numeral 50. The left connection end 48 has the common left hand mounting configuration and is therefore selectively connectable to the right connector end 40 of any light protector piece 12, and also selectively connectable to the right mount end 44 of the left hand piece 16. The right connection end 50 has the common right hand mounting configuration and is therefore selectively connectable to the left connector end 38 of any light protector piece 12, and also selectively connectable to the left mount end 46 of the right hand piece 18. As can be appreciated by those skilled in the art, any combination of light protector pieces, and if desired, spacer pieces, can be selectively connected between the left hand and right hand pieces 16 and 18 to form a substantially linear assembly of any desired configuration and length. For example, referring to FIG. 11, a substantially linear assembly 36 of an alternate configuration is shown comprising four light protector pieces 12 selectively connected between left hand and right hand pieces 16 and 18. In the configuration shown in FIG. 11, there are no spacer pieces used in the substantially linear assembly 36. As those skilled in the art will appreciate, selectively connecting light protector pieces 12 together without a spacer piece in-between would not be possible but for the left connector end 38 having the common left hand mounting configuration and the right connector end 40 having the common right hand mounting configuration, thereby allowing the left connector end 38 of one light protector piece 12 to be selectively connectable to any right connector end 40 of another light protector piece 12.

In the all embodiments shown, the opening 42 is shown having a circular shape for ease of illustration. It is to be appreciated that opening 42 may be configured to any size and shape, according to the present invention, to accommodate any headlight subassembly configuration. For example, an opening 42 for a circular headlight subassembly having a diameter of about 4.0 inches may be a circular opening having a diameter of about 4.5 inches, and an opening 42 for a circular headlight subassembly having a diameter of about 8.0 inches may be a circular opening having a diameter of about 8.5 inches. Accordingly, a rectangular opening may also be configured to accommodate a rectangular headlight subassembly, if desired. Hence, the size and shape of the opening 42 of every light protector piece is configured to conform to a particular shape and size of a particular headlight subassembly. This allows the modular light rack assembly 10 to accommodate a variety of different headlight subassemblies in one light rack.

Referring to FIGS. 5-8, adjustment brackets 20 and their connection with the left and right hand pieces, 16 and 18 respectively, are shown. The left hand and right hand pieces, 16 and 18, each comprise attachment ends, generally identified by numeral 52, for securing the light rack assembly to an off-road vehicle. In this embodiment, the attachment ends 52 comprise a lower mounting hole 54 and a upper mounting hole 56. Adjustment brackets 20 comprise a pivot hole 58 and adjustment slot 60. Fasteners 32 and nuts 34 connect the lower mounting hole 54 of both brackets 16 and 18 with the pivot hole 58 of their corresponding adjustment bracket 20, and the upper mounting hole 56 of both brackets 16 and 18 with the adjustment slot 60 of their corresponding adjustment bracket 20. As shown, each adjustment bracket 20 has a coupling end 62 for securing the light rack assembly to an off-road vehicle. As is commonly known in the art, coupling end 62 is typically clamped to a tubular frame member of the off-road vehicle with fasteners not shown, or welded directly to the tubular frame member.

Figure 9:
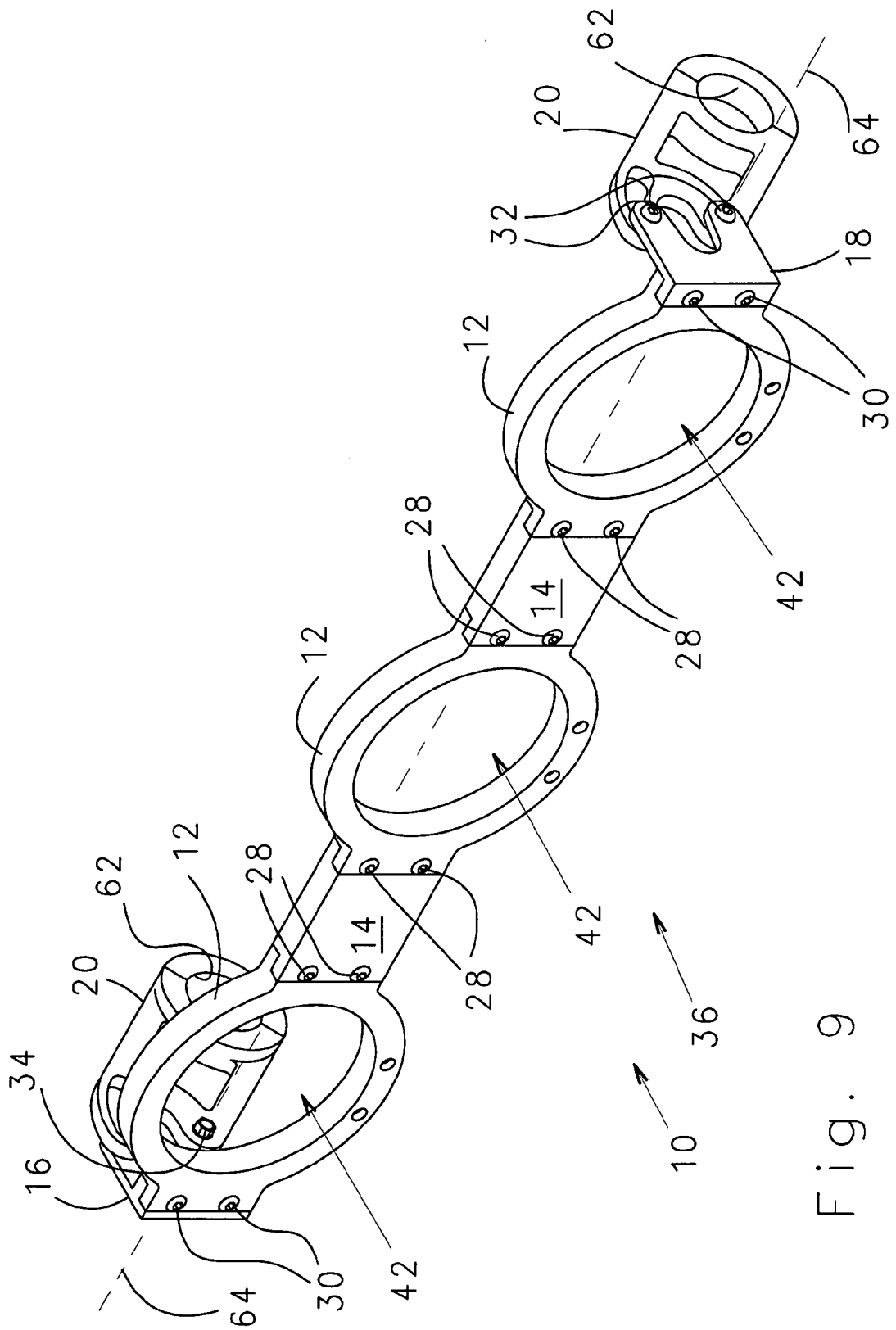
FIG. 9 is a perspective view of the light rack assembly of the embodiment shown in FIG. 1 without the headlight mount members and headlight subassemblies attached.

Referring to FIG. 9, the substantially linear assembly 36 is shown with the left and right hand pieces, 16 and 18 respectively, connected to the adjustment brackets 20, illustrated in FIGS. 5-8. A horizontal axis 64 is established between the pivot holes 58 of both adjustment brackets 20, allowing the modular light rack assembly 10 to be adjusted about the horizontal axis 64 by loosening and tightening fasteners 32 and nuts 34. With coupling ends 62 secured to the vehicle, the light rack assembly 10 can be adjusted about the horizontal axis 64. This allows for the vertical adjustment of the direction of the beams of light of the headlight subassemblies 22, shown in FIG. 1, to a desired position.

It is to be appreciated that adjustment brackets 20 need not be used to secure the modular light rack assembly 10 to a vehicle. For example, the left hand and right hand pieces 16 and 18 can attach the modular light rack assembly 10 to the vehicle by attachment ends 52, if desired. In addition, attachment ends 52 may be connected in conjunction with linear actuators to allow vertical adjustment of the direction of the beams of light of the headlight subassemblies while the vehicle is in motion, as disclosed in U.S. Pat. No. 7,249,875 to Roach et al. Alternatively, attachment ends 52 need not comprise upper mounting hole 56 and lower mounting hole 54, but may comprise a single mount hole to secure the modular light rack assembly 10 to the vehicle, if desired.

Figure 10:
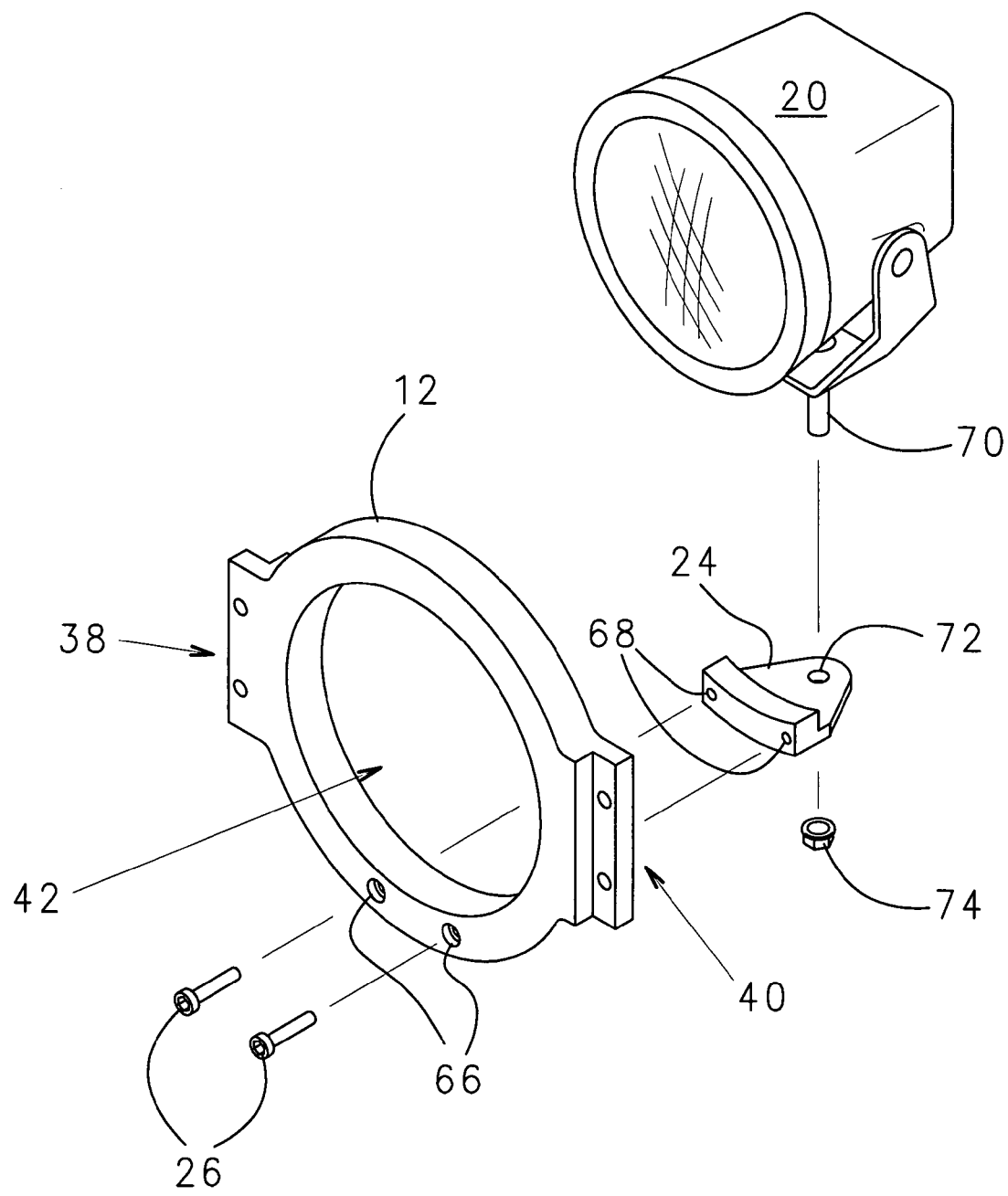
FIG. 10 is an exploded perspective view of a light protector piece, a headlight mount member, and a headlight subassembly of the embodiment shown in FIG. 1.

FIG. 10 shows a preferred manner of mounting a headlight subassembly 20 so that the light beam projected from the headlight subassembly passes through the opening in the light protector piece 12. As is well known in the art, a headlight subassembly 20 is a preassembled unit typically comprising a light housing, headlight reflector, bulb, light retainer ring, lens, ballast, and wiring as discussed in U.S. Pat. No. 7,249, 875 to Roach et. al. In FIG. 10, the headlight mount member 24 is connected to the light protector piece 12 with fasteners 26 that pass though holes 66 of the light protector piece 12 and engage threaded holes 68 in the headlight mount member 24. The headlight subassembly 20 has a threaded mount end 70 that is inserted in through hole 72 of the headlight mount member 24. The headlight subassembly 20 is secured to the headlight mount member 24 with a mounting nut 74 that engages threaded mount end 70. Alternatively, headlight mount member 24 may be integrally formed with the light protector piece 12 or welded or brazed to the light protector piece, if desired.

Referring back to FIG. 3, the substantially linear assembly 36 formed by selectively connecting the light protector pieces 12, right hand piece 18, left hand piece 16, and spacer pieces 14, appears as a continuous single unit. In this embodiment, each piece interlocks with the adjacent piece that it is selectively connected to, providing a resultant joint surface that is flush, making the substantially linear assembly 36 appear as a continuous single unit. It is preferred that each piece interlocks to form a substantially linear assembly 36 that appears as a continuous single unit, although it is not required. The resultant joint surface of each connected piece need not be flush. All that is required is that each piece having the common left hand mounting configuration on one end mate with the end of any other piece having the common right hand mounting configuration. Hence, for each embodiment, the common left hand mounting configuration and the common right hand mounting configuration are integrally related, so that each piece is selectively connectable to any other piece, left hand mounting configuration to right hand mounting configuration, to form the substantially linear assembly 36.

Figure 12:
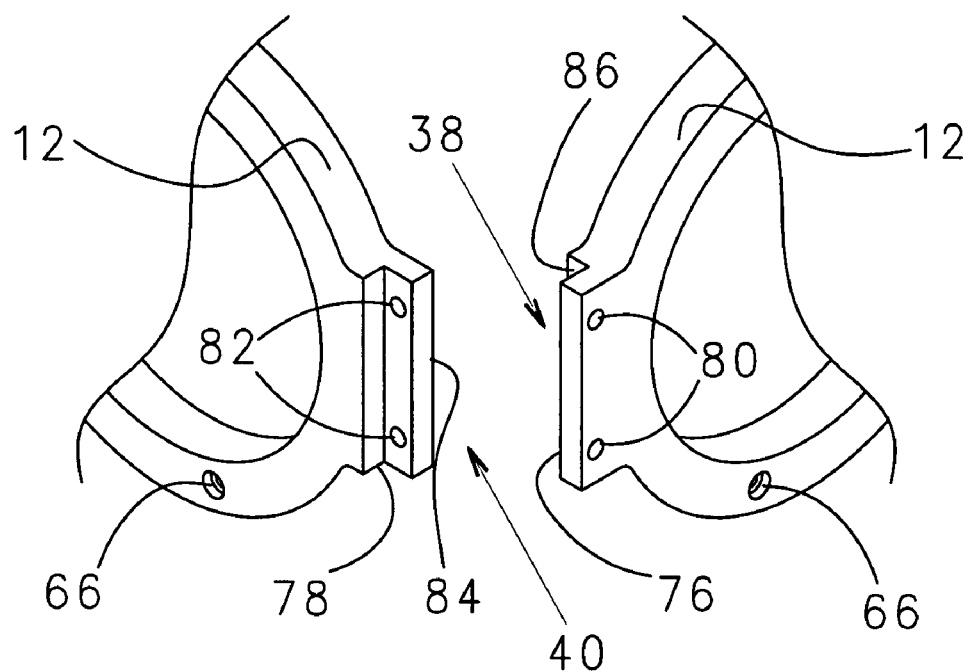
FIG. 12 is an exploded perspective view of two light protector pieces showing the left connector end defining the common left hand mounting configuration and the right connector end defining the common right hand mounting configuration of the embodiment shown in FIG. 1.
Figure 13:
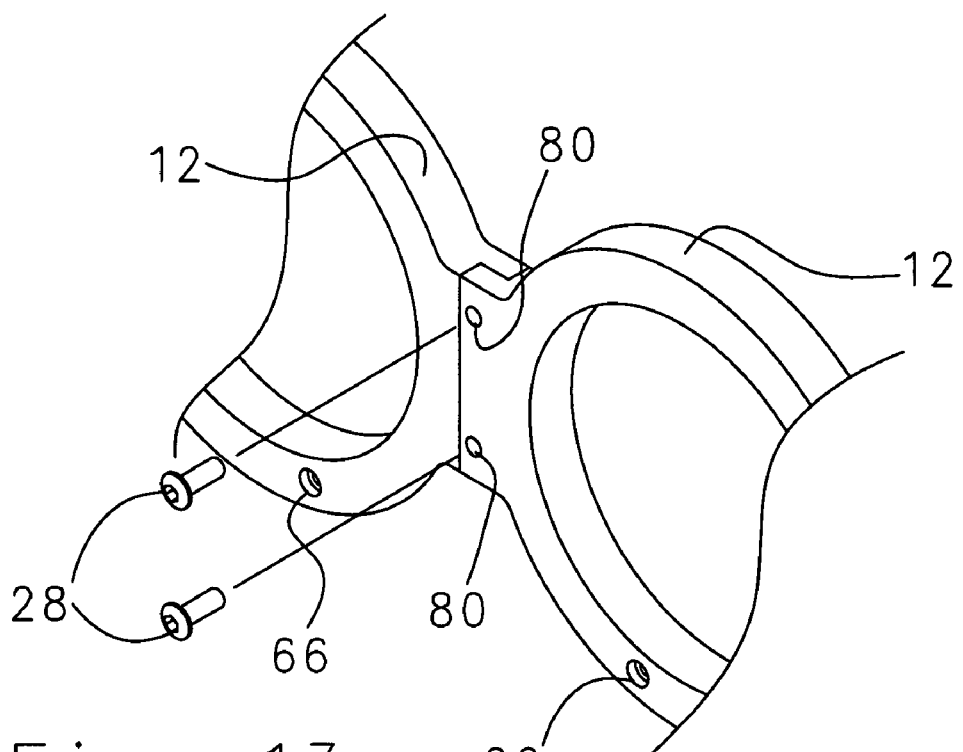
FIG. 13 is a perspective view of the two light protector pieces of FIG. 12, shown selectively connected.

Referring to FIGS. 12 and 13, the common left hand mounting configuration and the common right hand mounting configuration of the first embodiment are shown, exemplified by two adjacent light protector pieces 12 to be selectively connected. This is the preferred common left hand and right hand mounting configuration of the present invention. Hence, the modular light rack assembly 10 shown in FIG. 1 is a configuration that is exemplary of the preferred embodiment of the present invention. Referring back to FIGS. 12 and 13, each light protector piece 12 has a left connector end 38 defining a left hand mounting configuration and a right connector end 40 defining a right hand mounting configuration. For ease of illustration, only the left connector end 38 of the left most light protector piece 12 and only the right connector end 40 of the right most light protector piece 12 are shown. The left connector end 38 has one tab 76 and the right connector end has one recess 78 that mate when the two light protector pieces 12 are selectively connected, as shown in FIG. 13. This type of mating relationship is known as a lap joint. Through holes 80 are provided in the left connector end 38 and threaded holes 82 are provided in the right connector end 40. When the two light protector pieces 12 are selectively connected, as shown in FIG. 13, fasteners 28 are inserted into the through holes 80 and engage threaded holes 82 to secure the light protector pieces 12 together. Stated in the alternative, the right connector end 40 has one tab 84 while the left connector end 38 has one recess 86 that mate when the two light protector pieces 12 are selectively connected.

It is to be appreciated that the common left hand mounting configuration and the common right hand mounting configuration shown in FIGS. 12 and 13 of the left connector end 38 and right connector end 40, also apply to the left connection end 48 and right connection end 50 respectively of any spacer piece 14 utilized in the first embodiment. Further, the right mount end 44 of the left hand piece 16 of the first embodiment also has the same common right hand mounting configuration, and the left mount end 46 of the right hand piece 18 of the first embodiment also has the same common left hand mounting configuration. This allows for any combination of light protector pieces 12 and spacer pieces 14 to be selectively connected between a left to hand piece 16 and a right hand piece 18 to form a substantially linear assembly 36 of any desired configuration.

Figure 14:
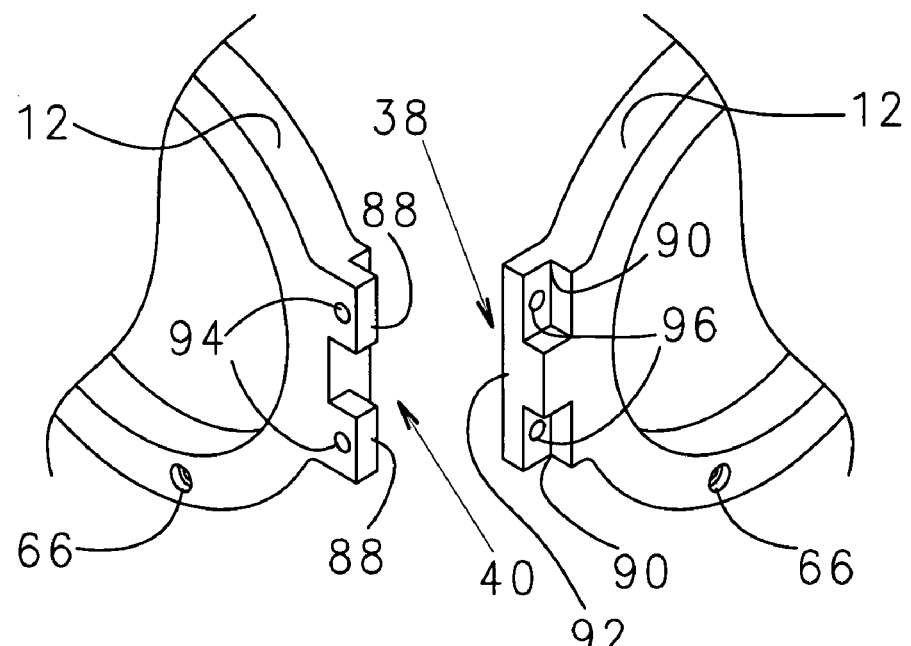
FIG. 14 is an exploded perspective view of two light protector pieces showing the left connector end defining an alternative common left hand mounting configuration and the right connector end defining an alternative common right hand mounting configuration of an alternative embodiment of the modular light rack assembly.
Figure 15:
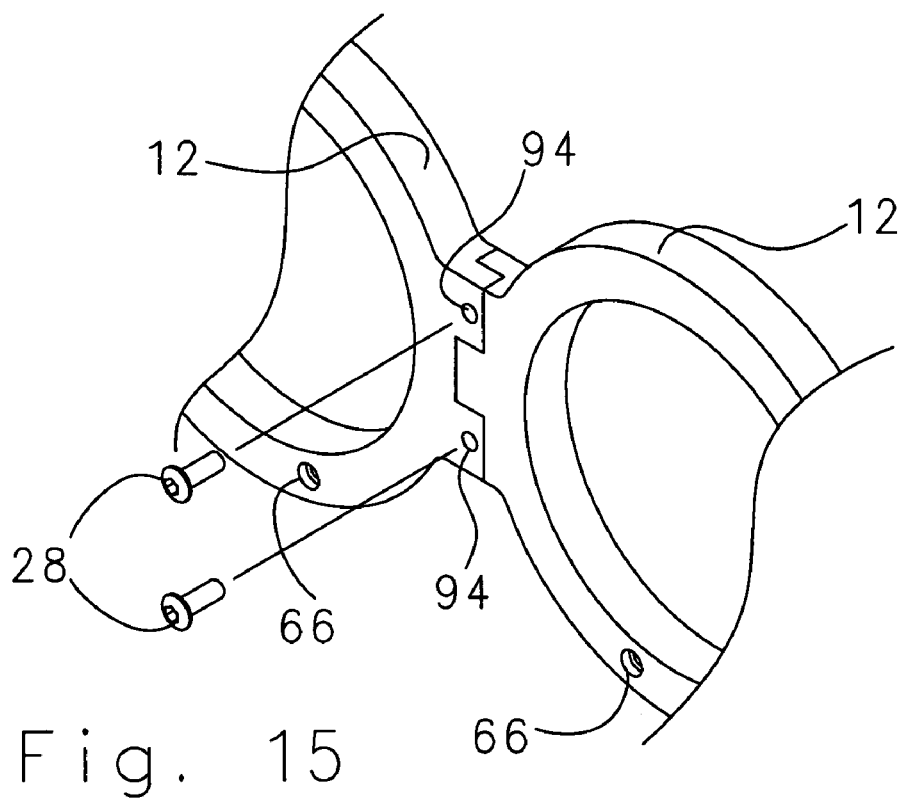
FIG. 15 is a perspective view of the two light protector pieces of FIG. 14, shown selectively connected.

Referring now to FIGS. 14 and 15, an alternate embodiment of the common left hand mounting configuration and the common right hand mounting configuration of the present invention are shown, exemplified by two adjacent light protector pieces 12 to be selectively connected. In this embodiment, the right connector end 40 has two tabs 88, and the left connector end 38 has two recesses 90 and one tab 92 that mate when the two light protector pieces 12 are selectively connected, as shown in FIG. 15. This type of mating relationship is a variant of a lap joint and a tongue and groove joint. Through holes 94 are provided in tabs 88 of the right connector end 40 and threaded holes 96 are provided in tab 92 of the left connector end 38. When the two light protector pieces 12 are selectively connect, as shown in FIG. 15, fasteners 28 are inserted into the through holes 94 and engage threaded holes 96 to secure the light protector pieces 12 together. As with the first embodiment, in this embodiment the left mount end 46 (not shown) of the right hand piece 18 (not shown) has the common left hand mounting configuration of this embodiment, and the right mount end 44 (not shown) of the left hand piece 16 (not shown) has the common right hand mounting configuration of this embodiment. Furthermore, the left connection end 48 (not shown) and right connection end 50 (not shown) of any spacer piece 14 (not shown) used in this embodiment also respectively have the common left hand mounting configuration and the common right hand mounting configuration of this embodiment. In this embodiment, as well as the first embodiment, any combination of light protector pieces 12 and spacer pieces 14 can be selectively connected between a left hand piece 16 and a right hand piece 18 to form a substantially linear assembly 36 of any desired configuration.

Figure 16:
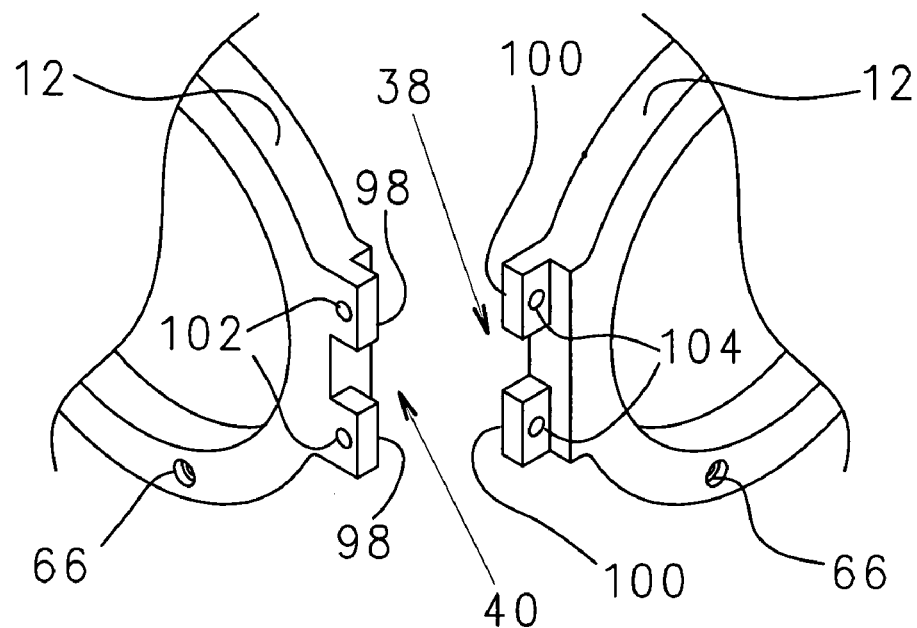
FIG. 16 is an exploded perspective view of two light protector pieces showing the left connector end defining another alternative common left hand mounting configuration and the right connector end defining another alternative common right hand mounting configuration of another alternative embodiment of the modular light rack assembly.
Figure 17:
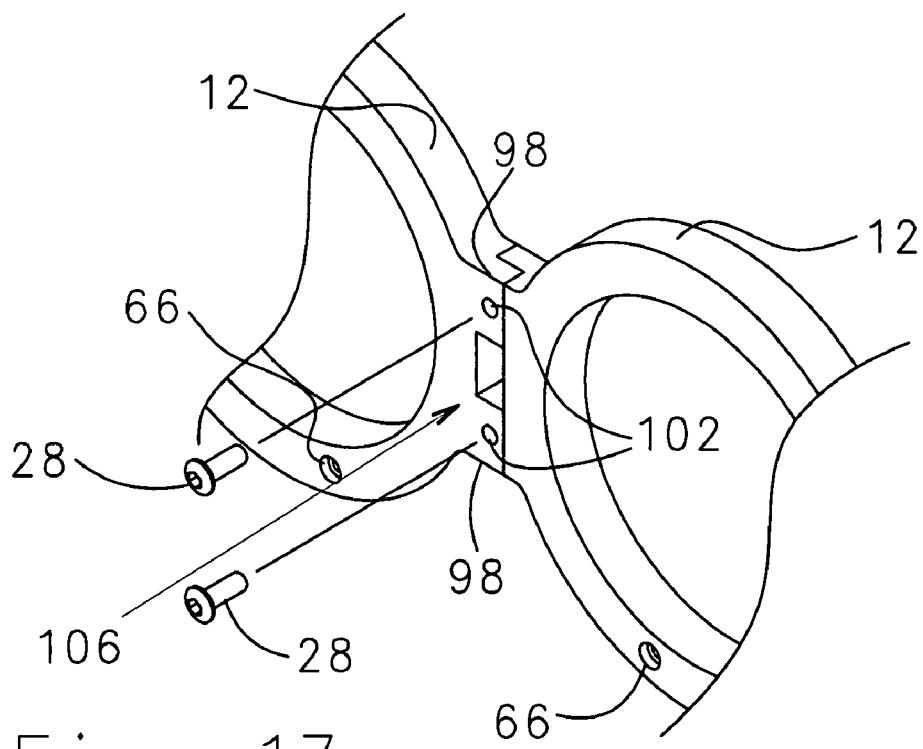
FIG. 17 is a perspective view of the two light protector pieces of FIG. 16, shown selectively connected.

Referring now to FIGS. 16 and 17, another alternate embodiment of the common left hand mounting configuration and the common right hand mounting configuration of the present invention are shown. In this embodiment, the right connector end 40 has two tabs 98 and the left connector end 38 has two tabs 100. Tabs 98 and tabs 100 mate when the two light protector pieces 12 are selectively connected, as shown in FIG. 17, leaving an aperture identified generally by numeral 106. This type of mating relationship is another variant of a lap joint and a tongue and groove joint. Through holes 102 are provided in tabs 98 and threaded holes 104 are provided in tabs 100 so that when the two light protector pieces 12 are selectively connected, fasteners 28 are inserted into the through holes 102 and engage threaded holes 104 to secure the light protector pieces 12 together. As with the other embodiments, in this embodiment the left mount end 46 (not shown) of the right hand piece 18 (not shown) has the common left hand mounting configuration of this embodiment, and the right mount end 44 (not shown) of the left hand piece 16 (not shown) has the common right hand mounting configuration of this embodiment. Furthermore, the left connection end 48 (not shown) and right connection end 50 (not shown) of any spacer piece 14 (not shown) used in this embodiment also respectively has the common left hand mounting configuration and the common right hand mounting configuration of this embodiment. In this embodiment, as well as the other embodiments, any combination of light protector pieces 12 and spacer pieces 14 can be selectively connected between a left hand piece 16 and a right hand piece 18 to form a substantially linear assembly 36 of any desired configuration.

Figure 18:
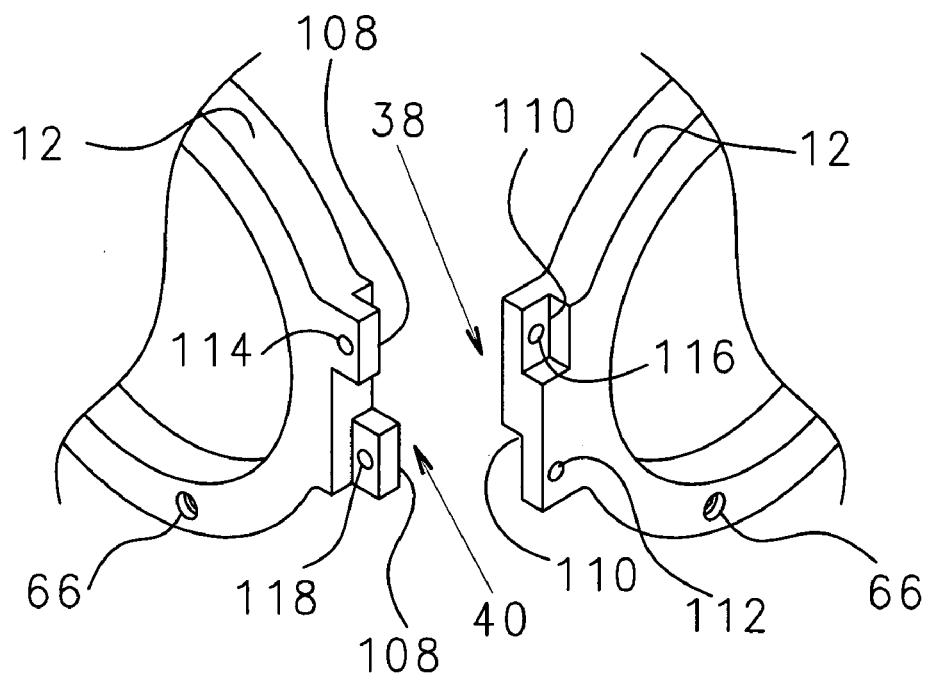
FIG. 18 is an exploded perspective view of two light protector pieces showing the left connector end defining yet another alternative common left hand mounting configuration and the right connector end defining yet another alternative common right hand mounting configuration of yet another alternative embodiment of the modular light rack assembly.
Figure 19:
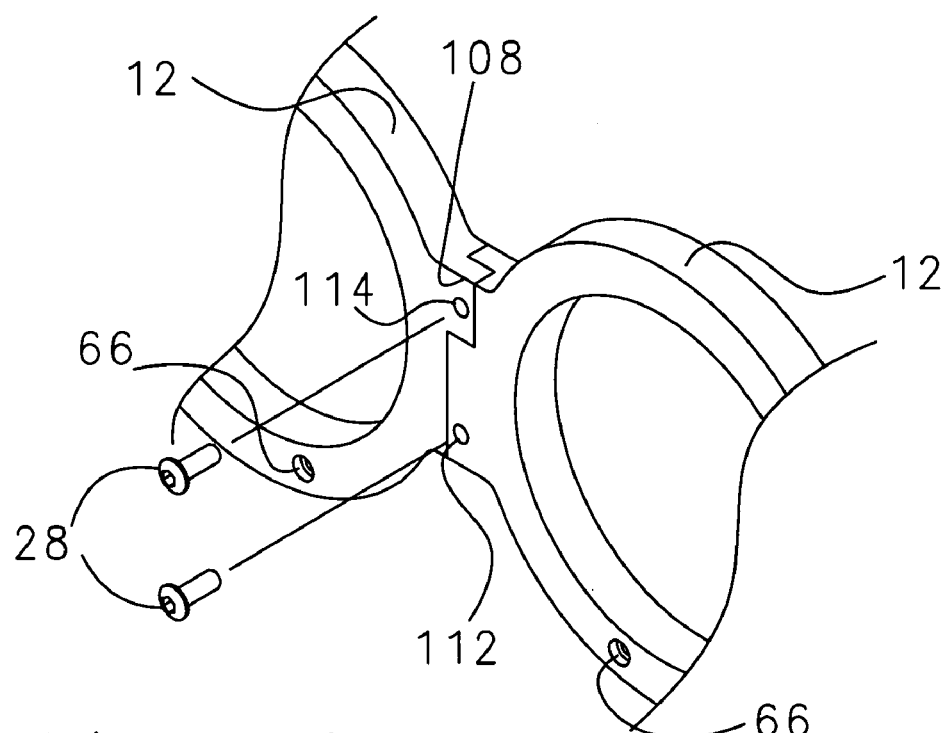
FIG. 19 is a perspective view of the two light protector pieces of FIG. 18, shown selectively connected.

Referring now to FIGS. 18 and 19, yet another alternate embodiment of the common left hand mounting configuration and the common right hand mounting configuration of the present invention are shown. In this embodiment, the right connector end 40 has two offset tabs 108, and the left connector end 38 has two offset recesses 110. As shown in FIG. 19, offset tabs 108 and offset recesses 110 mate when the two light protector pieces 12 are selectively connected. This type of mating relationship is a variant of a lap joint, and more aptly described as an offset lap joint. One through hole 112 is provided in the left connector end 38 and another through hole 114 is provided in the right connector end 40 of the light protector pieces 12. One threaded hole 116 is provided in the left connector end 38 and another threaded hole 118 is provided in the right connector end 40 of the light protector pieces. When the two light protector pieces 12 are selectively connected, through hole 114 aligns with threaded hole 116 and through hole 112 aligns with threaded hole 118, and fasteners 28 engage these alignments and secure the light protector pieces 12 together. As with all the embodiments, in this embodiment the left mount end of the right hand piece and the left connection end of any spacer piece has the common left hand mounting configuration of this embodiment, and the right mount end of the left hand piece and the right connection end of any spacer piece has the common right hand mounting configuration of this embodiment. Hence, in this embodiment, any combination of light protector pieces 12 and spacer pieces 14 can be selectively connected between a left hand piece 16 and a right hand piece 18 to form a substantially linear assembly 36 of any desired configuration.

Figure 20:
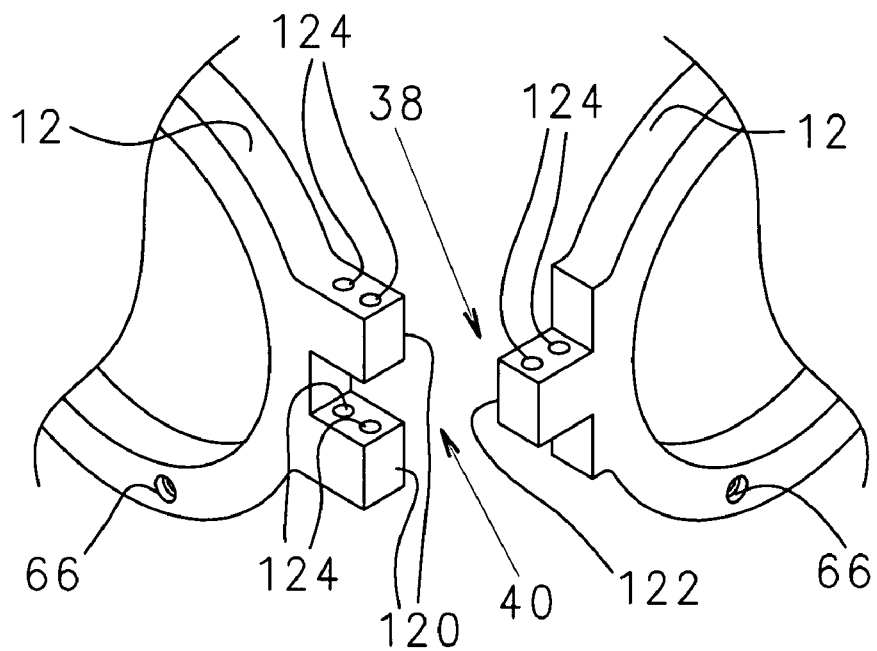
FIG. 20 is an exploded perspective view of two light protector pieces showing the left connector end defining still yet another alternative common left hand mounting configuration and the right connector end defining still yet another alternative common right hand mounting configuration of still yet another alternative embodiment of the modular light rack assembly.
Figure 21:
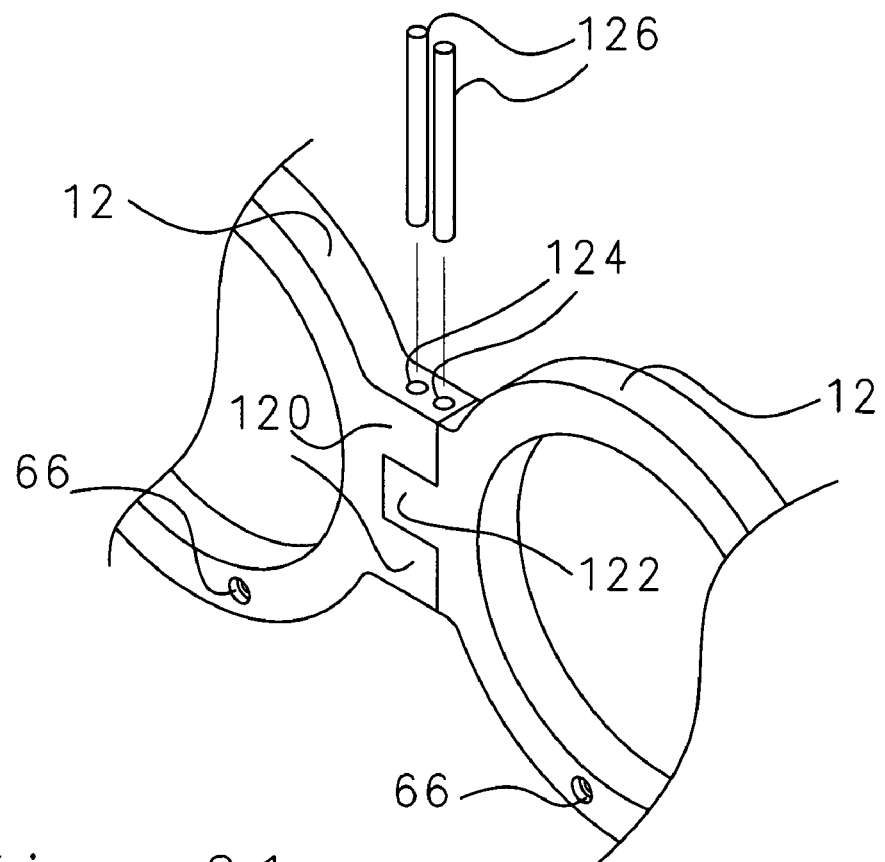
FIG. 21 is a perspective view of the two light protector pieces of FIG. 20, shown selectively connected.

Referring now to FIGS. 20 and 21, still yet another alternate embodiment of the common left hand mounting configuration and the common right hand mounting configuration of the present invention are shown. In this embodiment, the right connector end 40 has two tabs 120 and the left connector end 38 has one tab 122 that mate when the two light protector pieces 12 are selectively connected. This type of mating relationship is a combination of a finger joint and dowel joint. Press fit bores 124 are provided in tabs 120 and tab 122 that align to allow press fit dowels 126 to be driven into the aligned bores to secure the two light protector pieces 12, when the two light protector pieces are selectively connected, as shown in FIG. 21. As with all previous embodiments, in this embodiment the left mount end of the right hand piece and the left connection end of any spacer piece has the common left hand mounting configuration of this embodiment. Further, the right mount end of the left hand piece and the right connection end of any spacer piece has the common right hand mounting configuration of this embodiment. Again, any combination of light protector pieces 12 and spacer pieces 14 can be selectively connected between a left hand piece 16 and a right hand piece 18 to form a substantially linear assembly 36 of any desired configuration.

FIGS. 12-21, exemplify a number of embodiments of the present invention having alternative common left and right hand mounting configurations. It is to be appreciated that, according to the present invention, a multitude of alternative common left hand and right hand mounting configurations can be achieved. It is envisioned that variations of lap joints, finger joints, tongue and groove joints, dove joints, mortise and tenon joints, bridle joints, scarf joints, dowel joints, and the like, may be used, singularly or in combination, to establish a multitude of alternative common left hand and right hand mounting configurations, all in accordance with the present invention. All that is required is that a particular common left hand mounting configuration and common right hand mounting configuration be integrally related, so that each piece is selectively connectable to any other piece, left hand mounting configuration to right hand mounting configuration, to form a substantially linear assembly of any desired configuration.

What has been described are preferred embodiments of a modular light rack assembly adapted to be mounted to an off-road vehicle in which modifications and changes may be made without departing from the spirit and scope of the accompanying claims. Although a number of embodiments have been described above in detail, those skilled in the art will appreciate that numerous modifications are possible without materially departing from the novel teachings and advantages of the subject matter described herein. Other modifications, substitutions, changes, and omissions may be made in the design and arrangement of the preferred and other exemplary embodiments without departing from the spirit of the present invention.

What is claimed is:

1. A modular light rack assembly adapted to be mounted to a off-road vehicle, the light rack assembly comprising:
   at least one light protector piece having a left connector end defining a common left hand mounting configuration, the light protector piece having a right connector end defining a common right hand mounting configuration, the light protector piece having a opening between the left common connector end and the right common connector end to allow a light beam projected from a headlight to pass through the opening;

a left hand piece having a right mount end, the right mount end having the common right hand mount configuration;

a right hand piece having a left mount end, the left mount end having the common left hand mounting configuration;

wherein the left connector end and the left mount end that have the common left hand mounting configuration include at least one tab, and the right connector end and the right mount end that have the common right hand mounting configuration include at least one recess; and, wherein the tabs mate with the recesses when the light protector piece(s), the right hand piece, and the left hand piece are selectively connected, common left hand mounting configuration to common right hand mounting configuration, to form a substantially linear assembly.

2. The light rack assembly of claim 1 wherein the light protector piece(s), the right hand piece, and the left hand piece, interlock when selectively connected to form the substantially linear assembly.

3. The light rack assembly of claim 1 further comprising a plurality of fasteners for selectively connecting the light protector piece, the right hand piece, and the left hand piece of the substantially linear assembly.

4. The light rack assembly of claim 1 wherein the left hand piece and the right hand piece further comprise attachment ends for securing the light rack assembly to the off-road vehicle.

5. The light rack assembly of claim 4 further comprising:
at least two adjustment brackets, the first adjustment bracket connected to the attachment end of the left hand piece and the second adjustment bracket connected to the attachment end of the right hand piece; and
wherein the adjustment brackets are secured to the off-road vehicle.

6. The light rack assembly of claim 5 wherein the two adjustment brackets provide for the adjustment of the substantially linear assembly of the light rack assembly about a horizontal axis when the light rack assembly is secured to the vehicle.

7. The light rack assembly of claim 1 further comprising:
at least one spacer piece having a left connection end and a right connection end, the left connection end having the common left hand mounting configuration and the right connection end having the common right hand mounting configuration;
wherein the left connection end having the common left hand mounting configuration includes at least one tab, and the right connection end having the common right hand mounting configuration includes at least one recess; and,
wherein the tabs mate with the recesses when the light protector piece(s), the right hand piece, the left hand piece, and the spacer piece(s) are selectively connected, common left hand mounting configuration to common right hand mounting configuration, to form the substantially linear assembly.

8. The light rack assembly of claim 7 wherein the light protector piece(s), the right hand piece, the left hand piece, and the spacer piece(s), interlock when selectively connected to form the substantially linear assembly.

9. The light rack assembly of claim 8 further comprising a plurality of fasteners for selectively connecting the light protector piece, the right hand piece, the left hand piece, and the spacer piece(s) of the substantially linear assembly.

10. The light rack assembly of claim 1 further comprising:
a headlight mount member extending from the light protector piece for mounting a headlight subassembly to the headlight mount member so that the light beam projected from the headlight subassembly passes through the opening in the light protector piece.

11. The light rack assembly of claim 10 wherein the headlight mount member is integral with the light protector piece.

12. The light rack assembly of claim 10 wherein the headlight mount member is connected to the light protector piece with fasteners.

13. The light rack assembly of claim 10 further comprising:
a headlight subassembly mounted to the headlight mount member.

14. A modular light rack assembly adapted to be mounted to a off-road vehicle, the light rack assembly comprising:
at least one light protector piece having a left connector end defining a common left hand mounting configuration, the light protector piece having a right connector end defining a common right hand mounting configuration, the light protector piece having a opening between the left connector end and the right connector end to allow a light beam projected from a headlight to pass through the opening;
a left hand piece having a right mount end, the right mount end having the common right hand mount configuration;
a right hand piece having a left mount end, the left mount end having the common left hand mounting configuration;
wherein the right connector end and the right mount end that have the common right hand mounting configuration include at least one tab, and the left connector end and the left mount end that have the common left hand mounting configuration include at least one recess; and,
wherein the tabs mate with the recesses when the light protector piece(s), the right hand piece, and the left hand piece are selectively connected, common left hand mounting configuration to common right hand mounting configuration, to form a substantially linear assembly.

15. The light rack assembly of claim 14 wherein the light protector piece(s), the right hand piece, and the left hand piece, interlock when selectively connected to form the substantially linear assembly.

16. The light rack assembly of claim 14 further comprising:
at least one spacer piece having a left connection end and a right connection end, the left connection end having the common left hand mounting configuration and the right connection end having the common right hand mounting configuration;
wherein the right connection end having the common right hand mounting configuration includes at least one tab, and the left connection end having the common right hand mounting configuration includes at least one recess; and,
wherein the tabs mate with the recesses when the light protector piece(s), the right hand piece, the left hand piece, and the spacer piece(s) are selectively connected, common left hand mounting configuration to common right hand mounting configuration, to form the substantially linear assembly.

17. The light rack assembly of claim 16 wherein the light protector piece(s), the right hand piece, and the left hand piece, interlock when selectively connected to form the substantially linear assembly.

18. The light rack assembly of claim 17 further comprising a plurality of fasteners for selectively connecting the light protector piece(s), the right hand piece, the left hand piece, and the spacer piece(s) of the substantially linear assembly.

19. The light rack assembly of claim 18 further comprising:
- a headlight mount member extending from the light protector piece; and,
- a headlight subassembly mounted to the headlight mount member.

20. The light rack assembly of claim 14 wherein the left hand piece and the right hand piece further comprise attachment ends for securing the light rack assembly to the off-road vehicle.

21. The light rack assembly of claim 20 further comprising:
- at least two adjustment brackets, the first adjustment bracket connected to the attachment end of the left hand piece and the second adjustment bracket connected to the attachment end of the right hand piece; and,
- wherein the adjustment brackets are secured to the off-road vehicle.

22. The light rack assembly of claim 21 wherein the two adjustment brackets provide for the adjustment of the substantially linear assembly of the light rack assembly about a horizontal axis when the light rack assembly is secured to the vehicle.

* * * * *